No. 647,982. Patented Apr. 24, 1900.
J. W. OWEN.
BACK PEDALING BRAKE.
(Application filed Nov. 27, 1899.)
(No Model.)
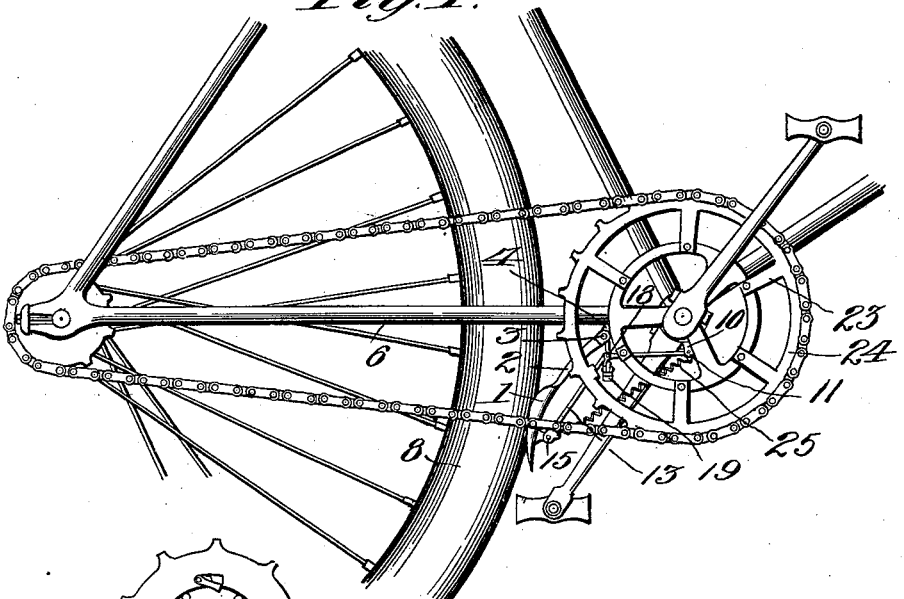
Fig. 1.
Fig. 4.
Fig. 2.
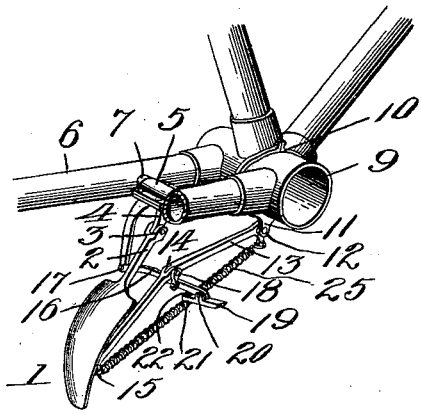
Fig. 3.
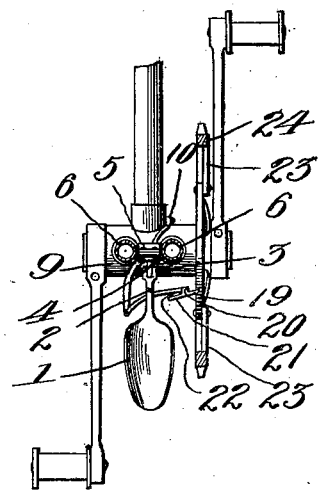
James Wesley Owen Inventor
Witnesses
Attorney
THE NORRIS PETERS CO., PHOTO-LITHO., WASHINGTON, D. C.

UNITED STATES PATENT OFFICE.

JAMES WESLEY OWEN, OF ITHACA, NEW YORK.

BACK-PEDALING BRAKE.

SPECIFICATION forming part of Letters Patent No. 647,982, dated April 24, 1900.

Application filed November 27, 1899. Serial No. 738,428. (No model.)

*To all whom it may concern:*

Be it known that I, JAMES WESLEY OWEN, a citizen of the United States, residing at Ithaca, in the county of Tompkins and State of New York, have invented a new and useful Brake, of which the following is a specification.

The object of this invention is to provide what is now known in the art as a "back-pedaling brake" for foot-propelled vehicles, the same being especially designed for use in connection with bicycles of the safety type, although it will be apparent as the description proceeds that the brake mechanism may be employed upon any kind of foot-propelled or other vehicle in which chain-and-sprocket driving-gear is employed for imparting motion to one of the carrying-wheels of the machine.

The primary object of the invention is to provide such a brake having but few parts, which are of strong and durable construction and which are therefore not liable to get out of order and render the brake inoperative; also, to construct the brake in such manner that it may be readily adjusted to any bicycle already in use or on the market.

The detailed objects and advantages of the invention will appear more fully in the course of the ensuing description.

The invention consists in a wheel-brake embodying certain novel features and details of construction and arrangements of parts, as hereinafter fully described, illustrated in the drawings, and incorporated in the claims.

In the accompanying drawings, Figure 1 is a side elevation of a sufficient portion of a bicycle to illustrate the application of the improved brake thereto looking toward that side of the machine upon which the driving sprocket-wheel is arranged. Fig. 2 is a perspective view taken adjacent to the crank-hanger, omitting the driving-gear. Fig. 3 is a vertical cross-section taken about in line with the trip-arm and extending through the frame and drive-sprocket to show the relation between the trip-lever and said sprocket-wheel. Fig. 4 is a detail sectional view of the rear-wheel clutch.

Similar numerals of reference designate corresponding parts in all the figures of the drawings.

For convenience in illustrating the present invention I have shown the brake applied to the driving-wheel of an ordinary safety-bicycle. The brake comprises, essentially, the brake-shoe 1, having a shank 2, the shoe and shank being arranged below the rear fork or bottom runs of the machine-frame and the shank extending upwardly, where it is pivotally connected at 3 to a lug or ear 4 on a clip or bracket 5, arranged between the rear fork members 6 and secured to, upon, or around the tie-brace 7, which connects the rear fork members in front of the rear or driving wheel 8. Where no such tie-brace 7 is employed, the bracket or clip may be attached to the machine in any other way which will suggest itself to the manufacturer, the essential feature being that a fulcrum be provided on the machine-frame adjacent to the rear wheel upon which the brake-shoe and its shank may be pivotally hung. Connected with the crank-hanger 9 is another clip or bracket 10, having one or more depending lugs 11, adapted to receive a pin 12, which forms the fulcrum for one end of one of a pair of toggle-levers 13. The toggle-levers 13 are pivotally connected at their adjoining ends by means of a knuckle-joint 14, and while the forward member of the toggle-levers is fulcrumed on the bracket which is attached to the crank-hanger the other or rear member of the toggle-levers is pivotally connected at 15 to the brake-shoe 1.

The toggle-levers are actuated by means of a trip-lever 16, which extends transversely of the machine-frame, being fulcrumed at one end, as at 17, on a bracket-arm 18, attached rigidly to the machine-frame. The trip-lever is connected at a point intermediate its ends to the knuckle 14 of the toggle-levers by means of a pivotal link 18, so that when the trip-lever is vibrated it serves, through the link connection 18, to pull down on the toggle-levers 13, the latter acting in turn to thrust or press the brake-shoe against the tire of the driving-wheel of the machine. The trip-lever is provided at its outer end with a trip-finger 19, pivotally connected at 20 to the extremity of the trip-lever. The trip-finger is also provided with a rearward or inward extension or shank 21, between which and the trip-lever 16 is interposed a spring 22, which allows the trip-finger to move independently of and without actuating the trip-lever when the trip-finger is acted upon by the spokes 23 of the driving-sprocket 24 of the machine. The outer end of the trip-finger 19 projects across the path of movement of the spokes 23 and is adapted to yield out of the way of the spokes when the driving-sprocket is moving in a forward direction or in the direction in which it should move when propelling the machine. When, however, the direction of rotation of the driving-sprocket is reversed, any one of the spokes is adapted to strike against the projecting trip-finger 19, and as the latter cannot yield out of the way in that direction the trip-lever 16 will as a result be vibrated and its outer end carried downward, and by reason of its linked connection with the toggle-levers it will straighten out said levers and press the brake-shoe against the tire of the driving-wheel.

The rear sprocket of the rear or driving wheel of the machine is equipped with a backing clutch or ratchet, so as to allow said driving-wheel to continue its forward rotation when the rider by backward pressure on the pedal stops the pedals and forward driving-sprocket of the machine. The rider thus by stopping the pedals throws the driving-gear out of action and by back-pedaling throws the trip-lever into operation, with the result above explained.

It will thus be seen that I have provided a simple, cheap, reliable, and efficient back-pedaling brake which may be applied to and used in connection with any foot-propelled vehicle or upon any machine employing chain-and-sprocket driving-gear. The brake is, however, especially designed for bicycles and is adapted to be applied to machines already in use or on the market, requiring no special alteration of the machine or modification of the construction thereof. A retracting-spring 25 connects with the brake-shoe and operates to throw the brake-shoe off the wheel.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed, and desired to be secured by Letters Patent, is—

1. In a back-pedaling brake for chain-and-sprocket-driven vehicles, the combination with a driving element, and a clutch-controlled driven element, of a spring-repressed brake-shoe, a toggle mechanism in operative relation to said shoe and to a point of resistance, and means operable by one of the gear elements to actuate said shoe through the toggle mechanism, as set forth.

2. In a back-pedaling brake for chain-and-sprocket-driven vehicles, the combination with a driving element, and a clutch-controlled driven element, of a brake-shoe, a toggle mechanism connected to the shoe and to a point of resistance, a fixed support, a trip-arm disposed across and connected to the toggle mechanism and also pivoted to the fixed support, and a yieldable finger connected to the trip-arm and disposed in the path of one of the gear elements, substantially as described.

3. A wheel-brake comprising a brake-shoe, toggle-levers connected therewith and to a fixed point of resistance, a trip-lever connected with the toggle-levers, a driving element arranged to operate the trip-lever, and a clutch-controlled driven element.

4. In a back-pedaling brake substantially such as described, a chain-and-sprocket driving-gear, one of the wheels of which is clutch-controlled, a brake-shoe, toggle-levers connected to the shoe and to a fixed point of resistance, and a trip-lever connected to the toggle-levers and projecting into the path of the spokes of one of the sprocket-wheels.

5. In a back-pedaling brake employing a chain-and-sprocket driving-gear, a brake-shoe, toggle-levers connected therewith and to a fixed point of resistance, and a trip-lever having a linked connection with the knuckle of the toggle-levers and projecting into the path of movement of the driving sprocket-wheel, one of said sprocket-wheels of the driving-gear being clutch-controlled, as set forth.

6. In a back-pedaling brake, a chain-and-sprocket driving-gear, one of the wheels of which is clutch-controlled, a brake-shoe, toggle-levers connected to the shoe and to a fixed point of resistance, a trip-lever, and a trip-finger on the trip-lever arranged for actuation by a movable part of the driving-gear, as set forth.

In testimony that I claim the foregoing as my own I have hereto affixed my signature in the presence of two witnesses.

JAMES WESLEY OWEN.

Witnesses:
 FRED E. ALDRICH,
 KITTIE E. GILLESPIE.